United States Patent [19]
Shirai et al.

[11] Patent Number: 6,101,879
[45] Date of Patent: Aug. 15, 2000

[54] ROTATION SPEED SENSOR

[75] Inventors: Katsuyoshi Shirai, Anjo; Satohiko Nakano, Chiryu; Yuji Hiraiwa, Anjo, all of Japan

[73] Assignee: Aisin Seiki Kabushiki Kaisha, Aichi-pref., Japan

[21] Appl. No.: 09/139,735

[22] Filed: Aug. 25, 1998

[30] Foreign Application Priority Data

Aug. 25, 1997 [JP] Japan ................................. 9-228449

[51] Int. Cl.[7] ........................................................ G01P 3/00
[52] U.S. Cl. ........................ 73/514.39; 324/168; 324/174
[58] Field of Search ........................ 73/514.39; 324/174, 324/173, 168, 166, 160, 207.25, 207.15; 310/152, 154, 155, 156

[56] References Cited

U.S. PATENT DOCUMENTS 5,744,720  4/1998  Ouchi .................................... 73/514.39
5,905,375  5/1999  Shirai et al. ............................ 324/174

FOREIGN PATENT DOCUMENTS 8-101223   4/1996  Japan .
8-94656    4/1996  Japan .
8-211081   8/1996  Japan .
8-327646  12/1996  Japan .

Primary Examiner—Richard A. Moller
Attorney, Agent, or Firm—Reed Smith Hazel & Thomas LLP

[57] ABSTRACT

In the present invention, a detection coil and a cancellation coil are closely provided and electrically connected in series to cancel induction noise. The cancellation coil may be disposed at a position not to sense the rotation. An axis of the cancellation coil may be provided in parallel to an axis of the detection coil. The numbers of turns for the cancellation coil may be the same as those for the detection coils. The cancellation coil may be disposed coaxial to the detection coils.

11 Claims, 8 Drawing Sheets

ROTATION SPEED SENSOR

BACKGROUND OF THE INVENTION

The present invention relates to a rotational speed sensor for detecting the rotational speed of a rotating member such as a wheel for a vehicle.

Various rotational speed sensors have been conventionally proposed. For example, Japanese Laid Open Patent Publication No. 08-211081, published on Aug. 20, 1996 and Japanese Laid Open Patent Publication No. 08-327646, published on Dec. 13, 1996, disclosed rotational speed sensors having ring-shaped yokes, ring-shaped magnets and ring-shaped detection coils. Further, Japanese Laid Open Patent Publication No.08-094656, published on Apr. 4, 1996, and Japanese Laid Open Patent Publication No. 08-101223, published on Apr. 16, 1996, disclosed rotational speed sensors having rod-shaped yokes, rod-shaped magnets and rod-shaped detection coils. These rotational speed sensors include pulsar rings that are mounted on rotating members. When the pulsar rings are rotated, the pulsar rings cause a change in magnetic flux that are converted to electrical signals by the detection coils.

However, these conventional speed sensors are easily affected by external alternating magnetic fields that may be created by an underground power transmission line or a heating wire buried under the road. In other words, these conventional speed sensors may not detect rotational speed accurately in the presence of such external alternating magnetic fields.

To reduce these magnetic fields or induction noise, magnetic shields may be added to the speed sensors but such magnetic shields are often not perfect. The number of turns may be reduced for the detection coils to reduce such induction noise but output signals will become weaker. In short, induction noise may be somewhat reduced by conventional schemes but may not be reduced satisfactorily.

SUMMARY OF THE INVENTION

Accordingly, a feature of the present invention is to solve the conventional problems described above.

A further feature of the present invention is to reduce induction noise.

To achieve the above features, according to the present invention, detection and cancellation coils are closely provided and electrically connected in series to cancel induction noise. The cancellation coil may be disposed at a position not to sense the rotation. An axis of the cancellation coil may be provided in parallel to an axis of the detection coil. The number of turns for the cancellation coil may be the same as those for the detection coils. The cancellation coil may be disposed coaxial to the detection coils.

DESCRIPTION OF THE PREFERRED EMBODIMENTS

Figure 1:
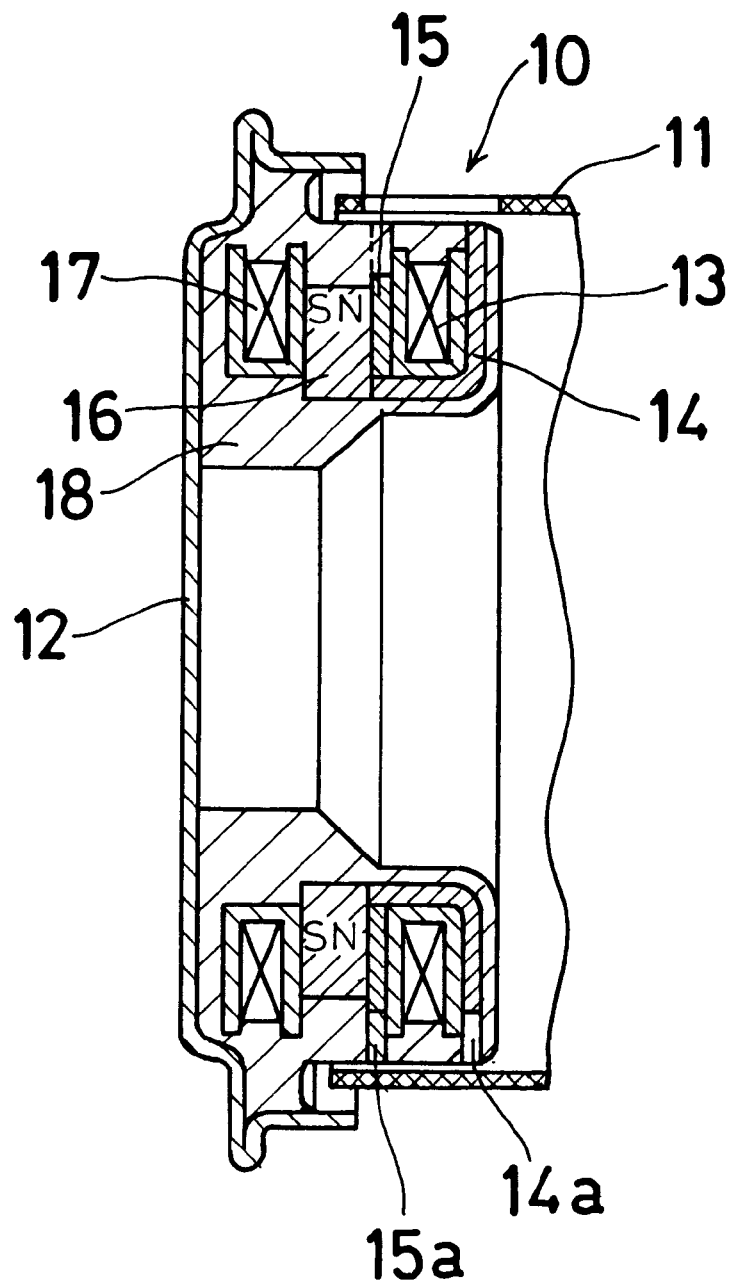
FIG. 1 is a cross sectional view of a rotational speed sensor according to the first embodiment of the present invention.

FIG. 1 is a cross sectional view of a rotational speed sensor 10 according to the first embodiment of the present invention. The rotational speed sensor 10 includes a pulsar ring 11 and a cover 12. The pulsar ring 11 is made from magnetic substance and mounted on an inner rotor (not shown) of a bearing unit for an automobile wheel (not shown). The cover 12 is mounted on an outer stationary member (not shown) of the bearing unit to close an opening (not shown) of the outer stationary member.

The cover 12 may be made from either magnetic or nonmagnetic substance. A plastic molding 18 is fixed in the cover 12 to hold a ring-shaped detection coil 13, ring-shaped yokes 14 and 15, a ring-shaped magnet 16 and a ring-shaped cancellation coil 17. The pulsar ring 11 has a sensed portion where many holes are formed along the circumference of the pulsar ring 11. The detection coil 13 is provided inside the pulsar ring 13 to be faced to the sensed portion of the pulsar ring 11. The detection coil 13 is also provided at one side of the magnet 16. The cancellation coil 17 is provided at the other side of the magnet 16 and is also provided coaxial to the detection coil 13 so that less change of the magnetic flux will be generated inside the cancellation coil 13 when the pulsar ring 11 is rotated. In other words, the cancellation coil 13 is insensitive to the rotation of the pulsar ring 11. The cancellation coil 13 is wound in opposite direction to the detection coil 13. The number of turns for the cancellation coil 17 is the same as that for the detection coil 13. The cancellation coil 17 is connected to the detection coil 13 in series. A pair of connecting terminals (not shown) or harnesses (not shown) are provided on the cover 12. The terminals or harnesses are electrically connected to ends of the detection and the cancellation coils 13 and 17 to supply output signal from the rotational speed sensor 10.

The magnet 16 is magnetized in the axial direction. Further, a plurality of poles 14a and 15a are formed at circumference parts of the yokes 14 and 15. These poles 14a and 15a are faced toward bridge portions (not shown) which are formed between punched holes (not shown) of the pulsar ring 11. The number of the poles 14a are the same as those of the bridge portions. The number of the poles 14a are also the same as those of poles 15a. Each of the poles 14a of the yoke 14 is positioned relative to each of the poles 15a of the yoke 15 with a half-pitch difference in its circumference direction. In other words, when the yokes 14 and 15 are seen from the axial direction, one of the poles 14a of the yoke 14 may be seen between two adjoined poles 15a of the yoke 15.

While the pulsar ring 11 rotates, following two magnetic circuits are alternately and periodically formed in accordance with the rotational speed of the pulsar ring 11:

First Magnetic Circuit

The poles 14a of the yoke 14 are faced toward the bridge portions of the pulsar ring 11. The poles 15a of the yoke 15 are faced to the punched holes. The magnetic flux flows from the N pole of the magnet 16 to the pulsar ring 11 through the yoke 14.

Second Magnetic Circuit

The poles 14a of the yoke 14 are faced toward the punched holes of the pulsar ring 11. The poles 15a of the yoke 15 are faced to the bridge portions. The magnetic flux flows from the N pole of the magnet 16 to the pulsar ring 11 through the yoke 15.

The magnetic flux returns from the pulsar ring 11 to the S pole of the magnet 16 through the least resistant path. For example, the magnetic flux may return from the pulsar ring 11 to the S pole of the magnet 16 through the cover 12 in case the cover 12 is made from the magnetic substance. Therefore, the amount of magnetic flux that passes through the inside of the detection coil 13 changes greatly due to the rotation of the pulsar ring 11. As a result, a voltage is generated in the detection coil 13 in proportion to this magnetic flux change (the time differential calculus).

As explained, the pulsar ring 11 alternatingly switches the first and the second magnetic circuits in accordance with the rotation of the pulsar ring 11 in the first embodiment. The first magnetic circuit is established by the magnet 16, the yoke 14 and the pulsar ring 11. The second magnetic circuit is established by the magnet 16, the yoke 15 and the pulsar ring 11.

However, while pulsar ring 11 is rotated, the amount of magnetic flux that passes through the inside of the cancellation coil 17 hardly changes so that no voltage is generated in the cancellation coil 17. This is because the cancellation coil 7 is positioned in a common part of the first and the second magnetic circuits.

Therefore, a rotational speed sensor 10 outputs a sine wave voltage with the period in proportion to the rotational speed of the pulsar ring 11.

Voltages are generated in both of the detection coil 13 and the cancellation coils 17 corresponding to the change of magnetic flux that passes through the detection and cancellation coils 13 and 17 when the external alternating magnetic field is applied from the axial direction of the rotational speed sensor 10. Because the number of turns of the detection coil 13 are the same as those of the cancellation coil 17, the voltage generated in the detection coil 13 becomes almost the same level with the voltage generated in the cancellation coil 17. However, the voltage generated by the detection coil 13 is offset by the voltage generated by the cancellation coil 17 because the detection coil 13 is wound in the opposite direction of the cancellation coil 17. The output voltage generated by the external alternating magnetic fields becomes nearly zero as a result.

Figure 2:
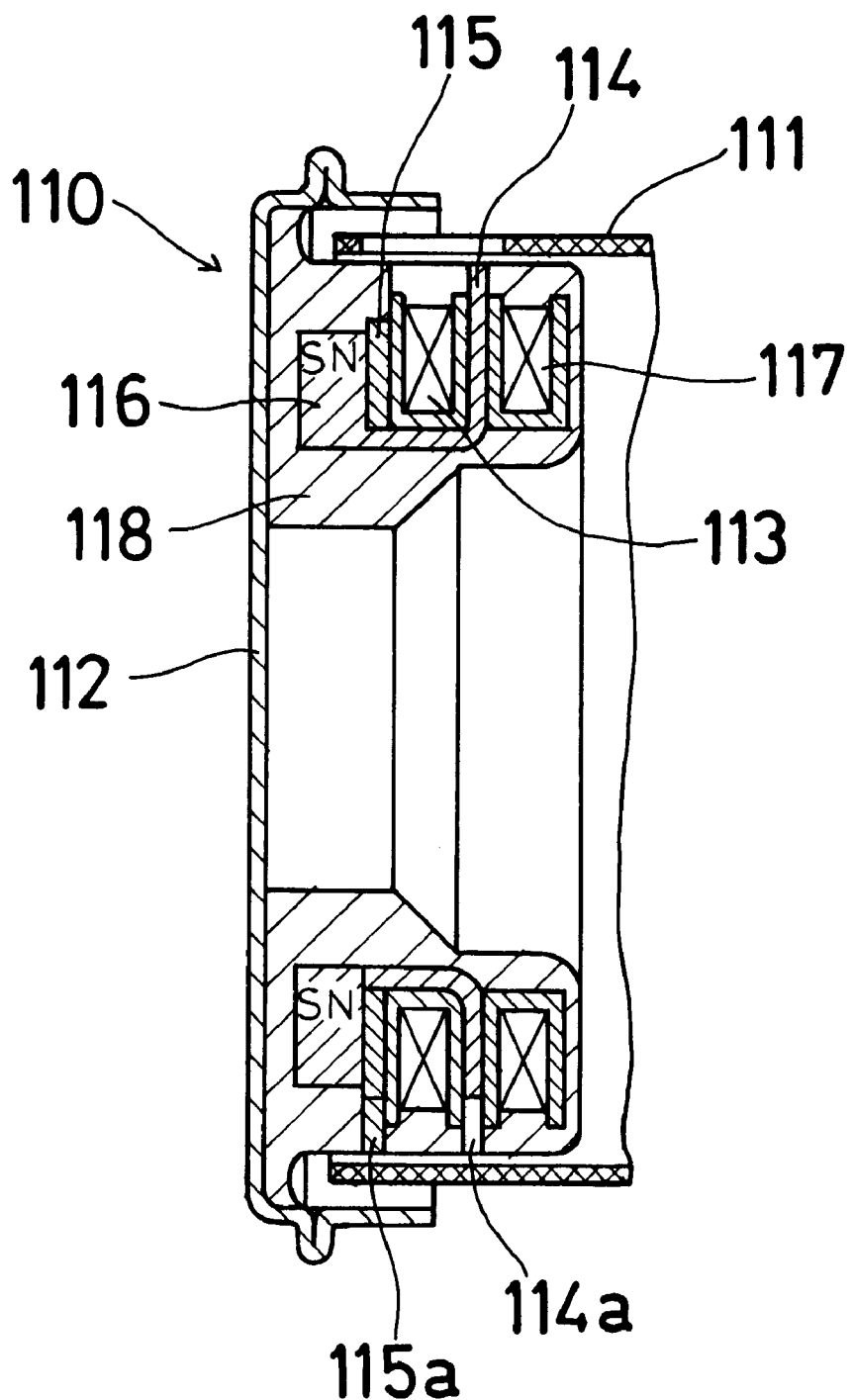
FIG. 2 is a cross sectional view of a rotational speed sensor according to the second embodiment of the present invention.

FIG. 2 is a cross sectional view of a rotational speed sensor 110 according to the second embodiment of the present invention. In the second embodiment, a cancellation coil 117 is adjoined to the yoke 114 at the opposite side of the detection coil 113. The cancellation coil 117 is still provided inside of the pulsar ring 111. Because the second embodiment is similar to the first embodiment, the elements that are equivalent to those of the first embodiment have the same rightmost two digits. In the second embodiment, substantially the same operations and advantages may be obtained if compared with the first embodiment.

Figure 3:
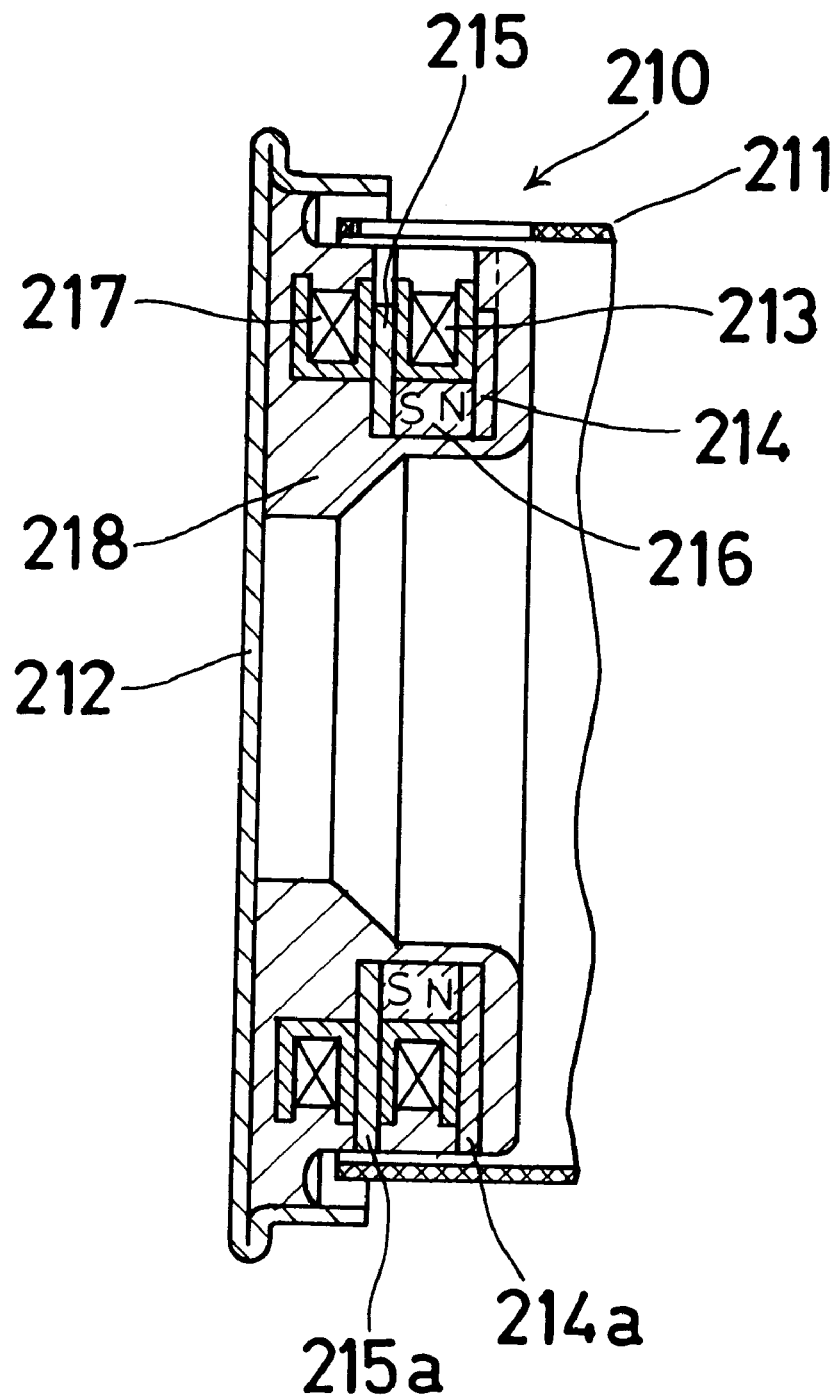
FIG. 3 is a cross sectional view of a rotational speed sensor according to the third embodiment of the present invention.

FIG. 3 is a cross sectional view of a rotational speed sensor 210 according to the third embodiment of the present invention. In the third embodiment, a magnet 216 is provided inside of the detection coil 213. Further, a cancellation coil 217 is adjoined to the yoke 215 at the opposite side of the detection coil 213. In addition, each of the poles 214a of the yoke 214 is positioned relative to each of the poles 215a of the yoke 215 without any difference in its circumference direction. Because the third embodiment is similar to the first embodiment, the elements that are equivalent to those of the first embodiment have the same rightmost two digits. In the third embodiment, substantially the same operations and advantages may be obtained if compared with the first embodiment. It is noted that the cancellation coil 217 is positioned outside the two magnetic circuits that are alternatingly switched due to the rotation of the pulsar ring 211.

Figure 4:
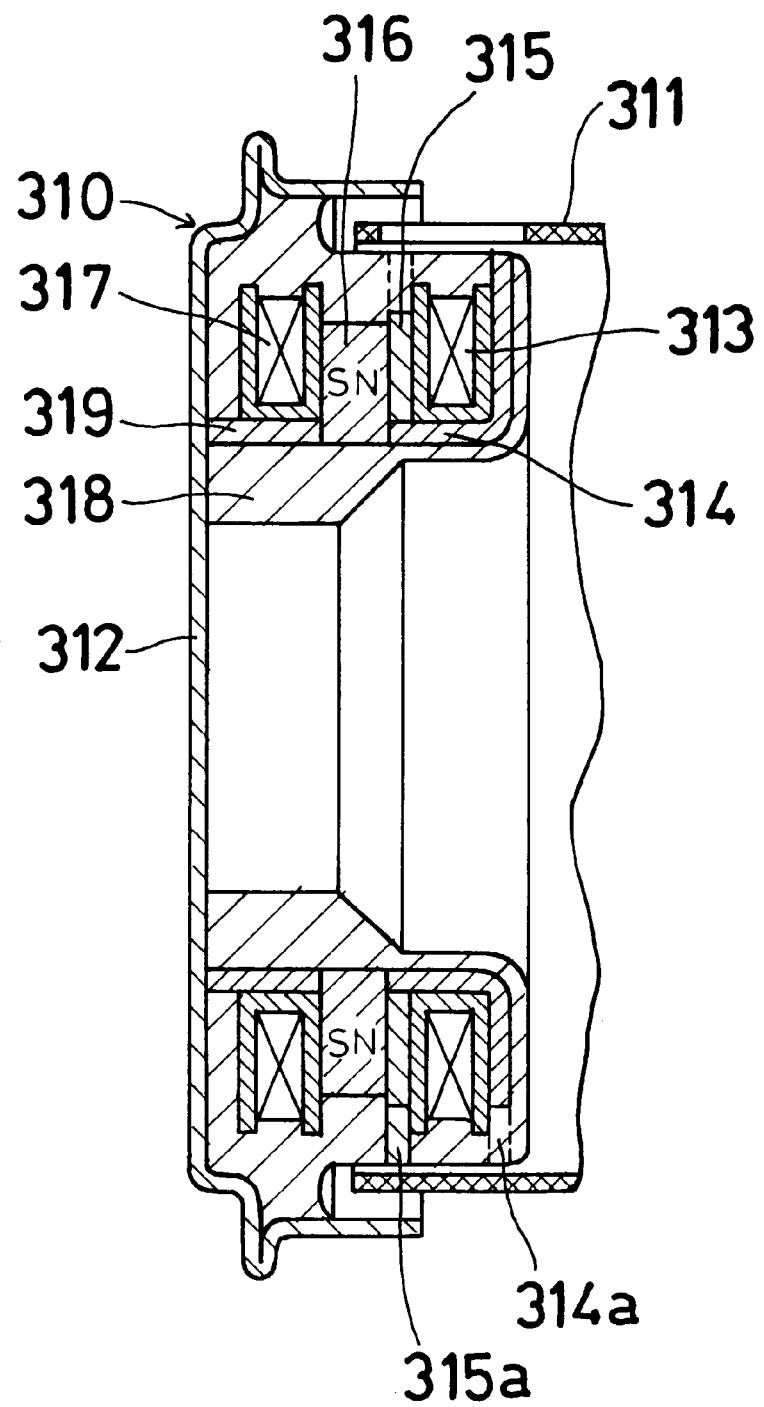
FIG. 4 is a cross sectional view of a rotational speed sensor according to the fourth embodiment of the present invention.

FIG. 4 is a cross sectional view of a rotational speed sensor 310 according to the fourth embodiment of the present invention. In the fourth embodiment, a cylindrical auxiliary yoke 319 made from the magnetic substance is provided inside the cancellation coil 317. Because the fourth embodiment is similar to the first embodiment, the elements that are equivalent to those of the first embodiment have the same rightmost two digits. In the fourth embodiment, substantially the same operations and advantages may be obtained if compared with the first embodiment. It is noted that the external alternating magnetic field is corrected inside of the detection and cancellation coils 313, 317 by a yoke 314 and the auxiliary yoke 319 when the external alternating magnetic field is applied from the axial direction of the rotational speed sensor 310. The external magnetic field may be equally applied to the detection coil 313 and cancellation coil 317 by the yoke 314 and the auxiliary yoke 319 so that the voltage generated by the detection coil 13 may be effectively offset by the voltage generated by the cancellation coil 17.

Figure 5:
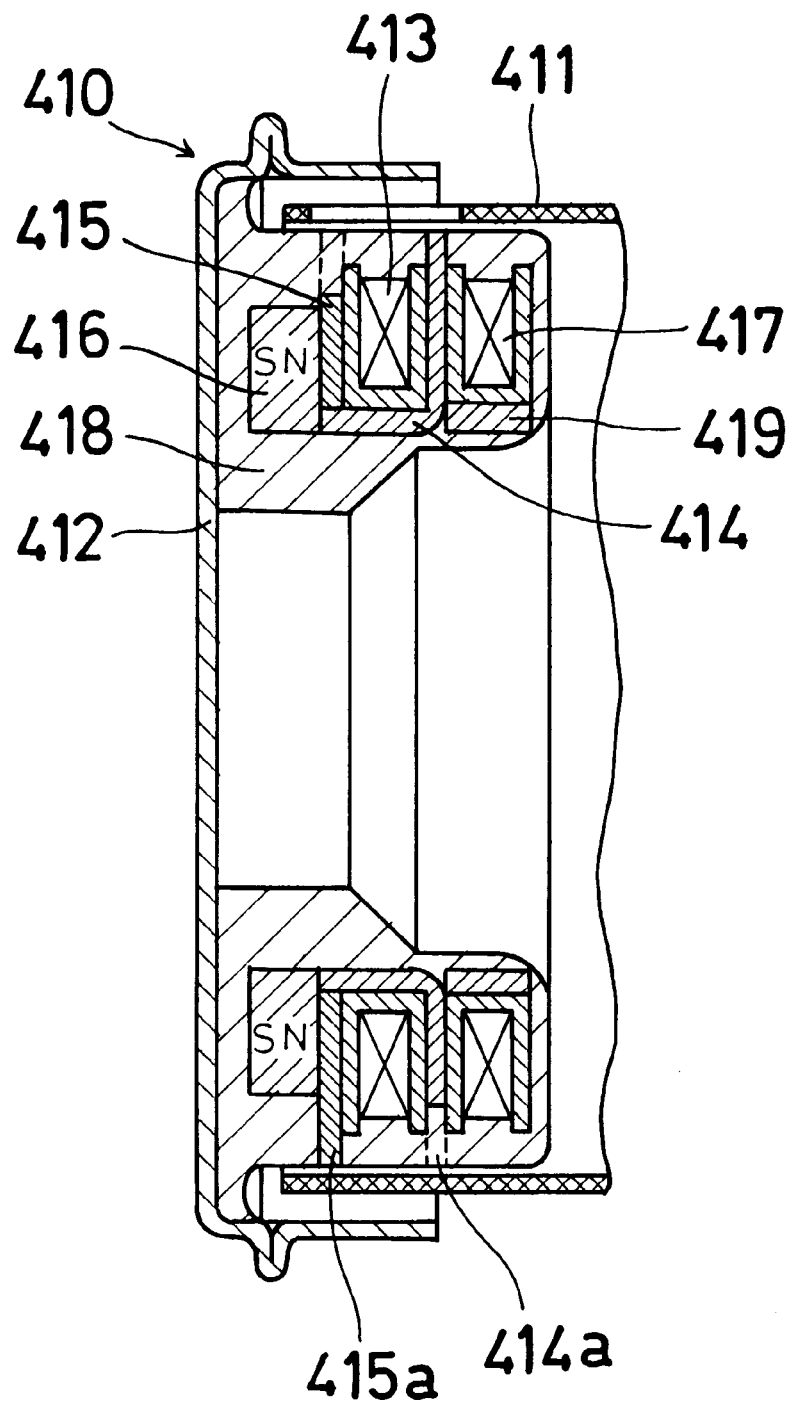
FIG. 5 is a cross sectional view of a rotational speed sensor according to the fifth embodiment of the present invention.

FIG. 5 is a cross sectional view of a rotational speed sensor 410 according to the fifth embodiment of the present invention. In the fifth embodiment, a cancellation coil 417 is provided inside the pulsar ring 411 and is adjoined to a yoke 414 at the opposite side of the detection coil 213. Further, a cylindrical auxiliary yoke 419 made from the magnetic substance is provided inside the cancellation coil 417. Because the fifth embodiment is similar to the first embodiment, the elements that are equivalent to those of the first embodiment have the same rightmost two digits. In the fifth embodiment, substantially the same operations and advantages may be obtained if compared with the first embodiment. It is noted that the cylindrical auxiliary yoke 419, has substantially the same operations and advantages as the auxiliary yoke 319 of the fourth embodiment.

Figure 6:
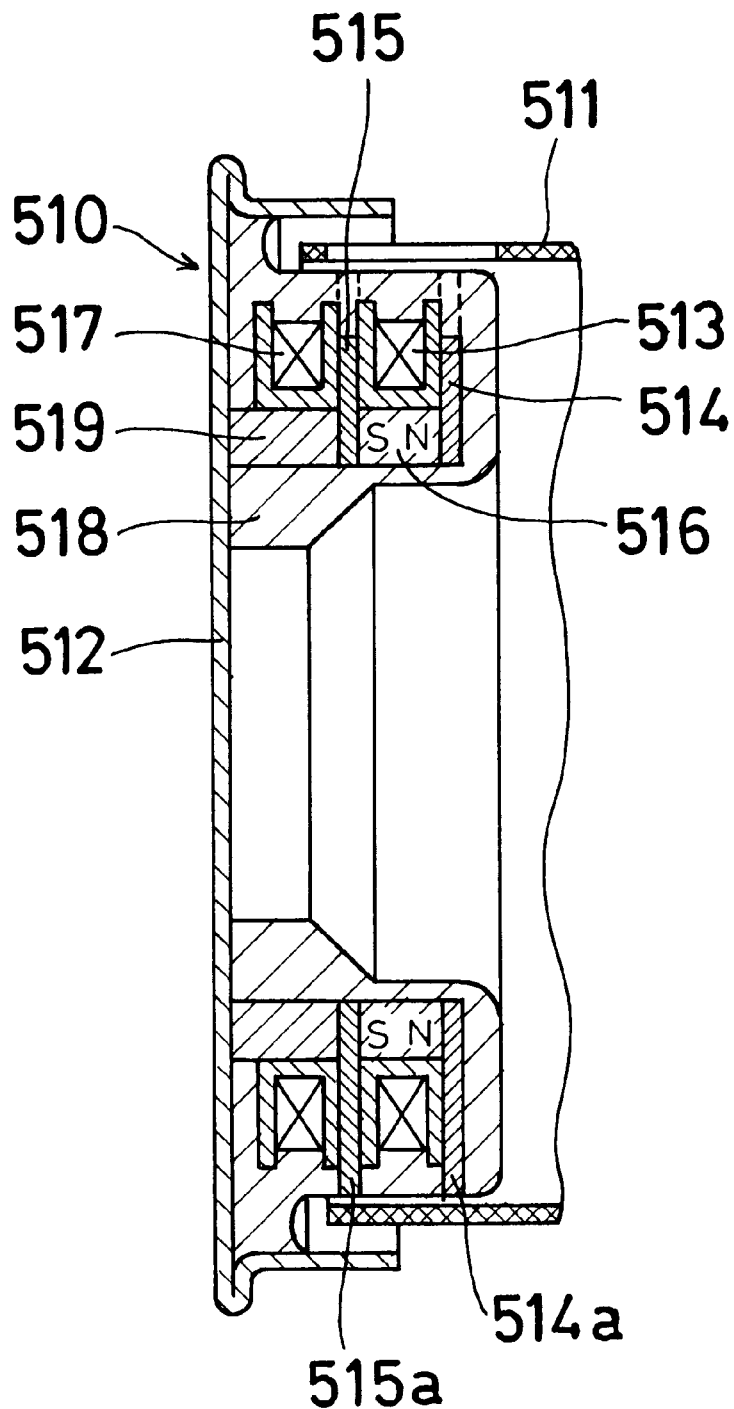
FIG. 6 is a cross sectional view of a rotational speed sensor according to the sixth embodiment of the present invention.

FIG. 6 is a cross sectional view of a rotational speed sensor 510 according to the sixth embodiment of the present invention. In the sixth embodiment, a magnet 516 is provided inside a detection coil 513. Further, a cancellation coil 517 is adjoined to a yoke 515 at the opposite side of the detection coil 513. Yet further, each of poles 514a of a yoke 514 is positioned relative to each of poles 515a of the yoke 515 without any difference in its circumference direction. In addition, a cylindrical auxiliary yoke 519 made from the magnetic substance is provided inside the cancellation coil 517. Because the sixth embodiment is similar to the first embodiment, the elements that are equivalent to those of the first embodiment have the same rightmost two digits. In the sixth embodiment, substantially the same operations and advantages may be obtained if compared with the first embodiment. It is noted is that the cylindrical auxiliary yoke 519 has substantially the same operations and advantages as the auxiliary yoke 319 of the fourth embodiment.

Figure 7:
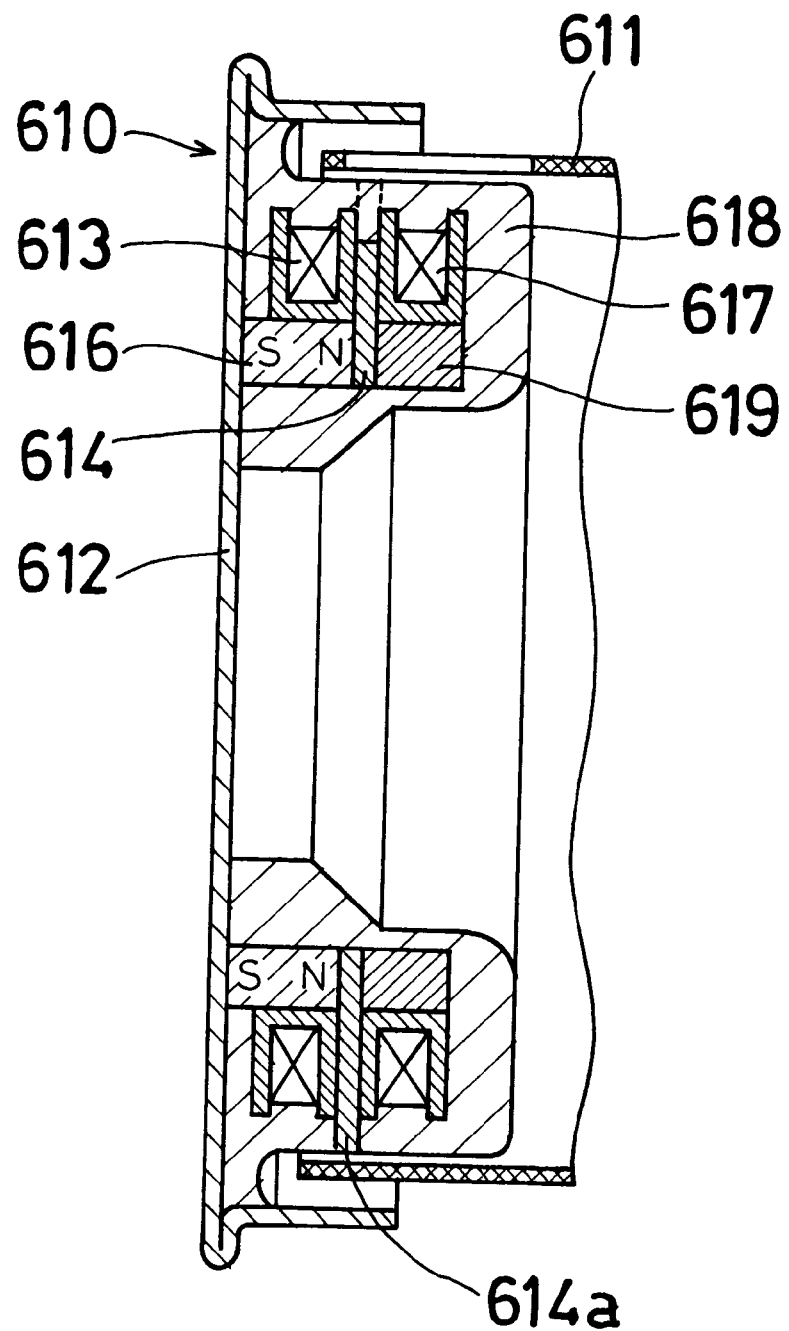
FIG. 7 is a cross sectional view of a rotational speed sensor according to the seventh embodiment of the present invention.

FIG. 7 is a cross sectional view of a rotational speed sensor 610 according to the seventh embodiment of the present invention. In the seventh embodiment, a cover 612 is made from magnetic substance so that a magnetic circuit is constituted by the cover 612, a magnet 616, a yoke 614 and a pulsar ring 611. A detection coil 613 is provided outside the magnet 616, in the magnetic circuit and between the cover 612 and the yoke 614. A cancellation coil 617 is adjoined to a yoke 614 at the opposite side of the detection coil 613. The cancellation coil 617 is provided outside the magnetic circuit. A cylindrical auxiliary yoke 619 made from the magnetic substance is provided inside the cancellation coil 617. Because the seventh embodiment is similar to the first embodiment, the elements that are equivalent to those of the first embodiment have the same rightmost two digits. In the seventh embodiment, substantially the same operations and advantages may be obtained if compared with the first embodiment. It is noted that the cylindrical auxiliary yoke 619 has substantially the same operations and advantages as the auxiliary yoke 319 of the fourth embodiment.

Figure 8:
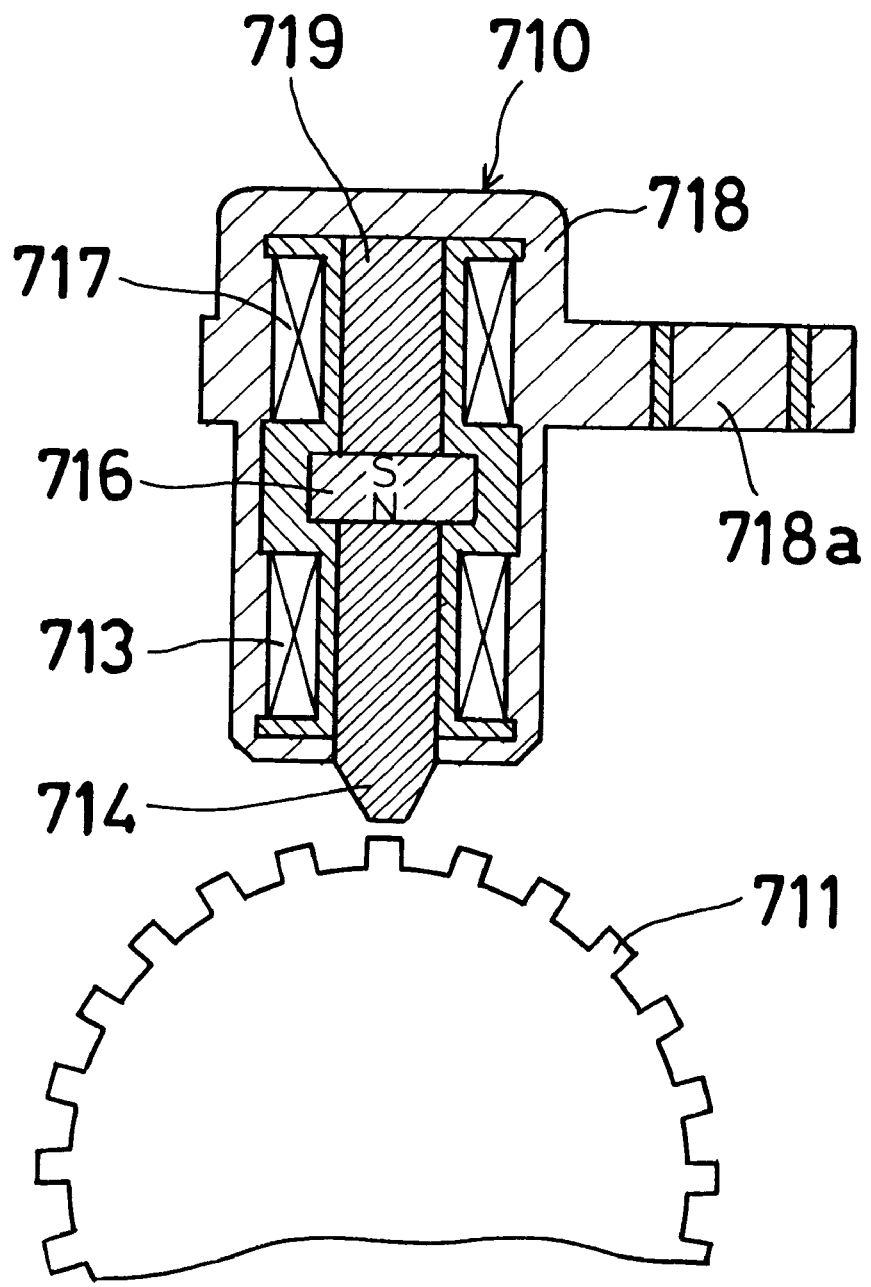
FIG. 8 is a cross sectional view of a rotational speed sensor according to the eighth embodiment of the present invention.

FIG. 8 is a cross sectional view of a rotational speed sensor 710 according to the eighth embodiment of the present invention. In the eighth embodiment, a pulsar ring 711 has a gear shape with projected teeth. The pulsar ring 711 is mounted on a rotating shaft (not shown). A yoke 714 is made from a magnetic substance. The yoke 714 is shaped like a rod. One end of the yoke 714 is facing teeth of the pulsar ring 711. The other end of the yoke is next to a disc magnet 716. A detection coil 713 has a cylindrical shape and is wound around the yoke 714. An auxiliary yoke 719 is made from magnetic substance and is adjoined to the magnet 716 at the opposite side of the yoke 714. A cancellation coil 717 has a cylindrical shape and is wound around the auxiliary yoke 719. The yoke 714, the magnet 716, the detection coil 713, the auxiliary yoke 719 and the cancellation coil 717 are integrated by a plastic molding 718. The plastic molding 718 is fixed to a stationary member (not shown) with a screw (not shown) extending through a mounted hole 718*a*. Although the detection coil 713 is wound in the opposite direction to the cancellation coil 717, the number of turns for the detection coil 713 are the same as that for the cancellation coil 717. Further, the detection coil 713 is electrically connected to the cancellation coil 717 in series. Because the eighth embodiment is similar to the first embodiment, the elements that are equivalent to those of the first embodiment have the same rightmost two digits. In the eighth embodiment, substantially the same operations and advantages may be obtained if compared with the first embodiment. It is noted that the rod-shaped auxiliary yoke 719 has substantially the same operations and advantages as the auxiliary yoke 319 of the fourth embodiment.

As explained thoroughly above, the output signal voltage generated by the external alternating magnetic field may be reduced to zero volt according to the present invention.

What is claimed is:

1. A rotational speed sensor comprising:

a magnet to generate magnetic flux due to its rotation;

a pulsar ring to make change in the magnetic flux;

a detection coil to detect the change in magnetic flux in accordance with rotational speed thereof;

a cancellation coil to be wound in opposite direction to the detection coil and to be provided close to the detection coil not to sense the rotation of the pulsar ring; and an electrical connection to connect the detection coil to the cancellation coil in series.

2. A rotational speed sensor according to claim 1, wherein an axis of the detection coil is in parallel to an axis of the cancellation coil.

3. A rotational speed sensor according to claim 2, wherein the detection coil is in coaxial to the cancellation coil.

4. A rotational speed sensor according to claim 1, wherein the number of turns for the detection coil is equal to the number of turns for the cancellation coil.

5. A rotational speed sensor according to claim 1 further comprising: a yoke to be provided inside of the detection coil; and an auxiliary yoke to be provided inside the cancellation coil.

6. A rotational speed sensor according to claim 1 further comprising:

a first magnetic circuit for flowing the magnetic flux so as to pass through the detection coil and the cancellation coil; and a second magnetic circuit for flowing the magnetic flux so as to pass through the cancellation coil and so as not to pass through the detection coil;

wherein the pulsar ring alternately switches the first and second magnetic circuits.

7. A rotational speed sensor according to claim 1 further comprising:

a first magnetic circuit for flowing the magnetic flux so as to pass through the detection coil and so as not to pass through the cancellation coil; and a second magnetic circuit for flowing the magnetic flux so as not to pass through the detection coil and the cancellation coil;

wherein the pulsar ring alternately switches the first and second magnetic circuits.

8. A rotational speed sensor according to claim 6 wherein:

the first magnetic circuit is established by the magnet, a first yoke, and the pulsar ring; and the second magnetic circuit is established by the magnet, a second yoke, and the pulsar ring.

9. A rotational speed sensor according to claim 6 wherein:

the first magnetic circuit is established by the magnet, a first yoke, the pulsar ring, and a cover; and the second magnetic circuit is established by the magnet, a second yoke, the pulsar ring, and the cover.

10. A rotational speed sensor according to claim 7 wherein:

the first magnetic circuit is established by the magnet, a first yoke, and the pulsar ring; and the second magnetic circuit is established by the magnet, a second yoke, and the pulsar ring.

11. A rotational speed sensor according to claim 7 wherein:

the first magnetic circuit is established by the magnet, a first yoke, the pulsar ring, and a cover; and the second magnetic circuit is established by the magnet, a second yoke, the pulsar ring, and the cover.

* * * * *